US012772013B2

(12) United States Patent
Littrell

(10) Patent No.: US 12,772,013 B2
(45) Date of Patent: Oct. 20, 2026

(54) MICROPHONE HAVING A DIGITAL OUTPUT DETERMINED AT DIFFERENT POWER CONSUMPTION LEVELS

(71) Applicant: QUALCOMM Incorporated, San Diego, CA (US)

(72) Inventor: Robert J. Littrell, Belmont, MA (US)

(73) Assignee: QUALCOMM Incorporated, San Diego, CA (US)

(*) Notice: Subject to any disclaimer, the term of this patent is extended or adjusted under 35 U.S.C. 154(b) by 226 days.

(21) Appl. No.: 18/659,919

(22) Filed: May 9, 2024

(65) Prior Publication Data

US 2026/0019761 A1 Jan. 15, 2026

Related U.S. Application Data

(63) Continuation of application No. 18/126,938, filed on Mar. 27, 2023, now Pat. No. 12,010,488, which is a (Continued)

(51) Int. Cl.
*H04R 29/00* (2006.01)
*G10L 25/18* (2013.01)

(Continued)

(52) U.S. Cl.
CPC ............ *H04R 29/004* (2013.01); *G10L 25/18* (2013.01); *G10L 25/21* (2013.01); *G10L 25/78* (2013.01);

(Continued)

(58) Field of Classification Search
CPC ...... H04R 29/004; H04R 17/02; H04R 19/04; H04R 2201/003; G10L 25/18; G10L 25/21; G10L 25/78
See application file for complete search history.

(56) References Cited

U.S. PATENT DOCUMENTS

| | | | |
|---|---|---|---|
| 3,636,463 A | 1/1972 | Ongkiehong | |
| 4,991,145 A | 2/1991 | Goldstein et al. | |

(Continued)

FOREIGN PATENT DOCUMENTS

| | | |
|---|---|---|
| CN | 103019373 A | 4/2013 |
| CN | 203882609 U | 10/2014 |

(Continued)

OTHER PUBLICATIONS

CN Search Report in Chinese Application No. 201780026345.6, dated May 11, 2020, 2 pages.

(Continued)

*Primary Examiner* — Andrew Sniezek
(74) *Attorney, Agent, or Firm* — QUALCOMM Incorprated; Espartaco Diaz Hidalgo

(57) ABSTRACT

An acoustic device is described and includes an acoustic sensor element configured to sense acoustic energy and produce an output signal and a threshold detector circuit including a switch having an input coupled to the output of the acoustic sensor element to receive the output signal, a control port that receives a control signal, and first and second output ports, a first channel including an analog-to-digital converter that operates at a first power level a second analog-to-digital converter that operates at a second higher power level, relative to the first power level and a threshold level detector that receives an output from the first analog-to-digital converter to produce the control signal having a first state that causes the switch feed the output signal from the acoustic sensor element to the second analog-to-digital converter when the first digitized output signal meets a threshold criteria.

20 Claims, 8 Drawing Sheets

Related U.S. Application Data continuation of application No. 16/819,673, filed on Mar. 16, 2020, now Pat. No. 11,617,048.

(60) Provisional application No. 62/818,216, filed on Mar. 14, 2019.

(51) Int. Cl.

| | |
|---|---|
| ***G10L 25/21*** | (2013.01) |
| ***G10L 25/78*** | (2013.01) |
| ***H04R 17/02*** | (2006.01) |
| ***H04R 19/04*** | (2006.01) |

(52) U.S. Cl.

CPC ............. *H04R 17/02* (2013.01); *H04R 19/04* (2013.01); *H04R 2201/003* (2013.01)

(56) References Cited

U.S. PATENT DOCUMENTS

| | | | | |
|---|---|---|---|---|
| 5,323,141 | A | 6/1994 | Petek | |
| 5,644,308 | A | 7/1997 | Kerth et al. | |
| 6,243,595 | B1 | 6/2001 | Lee et al. | |
| 7,948,153 | B1 | 5/2011 | Kellogg et al. | |
| 8,896,184 | B2 | 11/2014 | Grosh et al. | |
| 9,052,332 | B2 | 6/2015 | Huang et al. | |
| 9,425,818 | B1 | 8/2016 | Rajaee et al. | |
| 9,799,337 | B2 | 10/2017 | Chang et al. | |
| 10,001,391 | B1 | 6/2018 | Littrell | |
| 10,028,054 | B2 | 7/2018 | Furst et al. | |
| 10,715,922 | B2 | 7/2020 | Littrell | |
| 11,617,048 | B2 | 3/2023 | Littrell | |
| 12,010,488 | B2 * | 6/2024 | Littrell | H04R 17/02 |
| 2003/0042117 | A1 | 3/2003 | Ma | |
| 2006/0195164 | A1 | 8/2006 | Sondergaard et al. | |
| 2007/0129941 | A1 | 6/2007 | Tavares | |
| 2008/0109095 | A1 | 5/2008 | Braithwaite et al. | |
| 2010/0039923 | A1 | 2/2010 | Kim et al. | |
| 2011/0142261 | A1 | 6/2011 | Josefsson | |
| 2011/0233693 | A1 | 9/2011 | Perruchot et al. | |
| 2012/0026716 | A1 | 2/2012 | Bauer et al. | |
| 2012/0087521 | A1 | 4/2012 | Delaus et al. | |
| 2012/0250909 | A1 | 10/2012 | Grosh et al. | |
| 2012/0299937 | A1 | 11/2012 | Brown et al. | |
| 2013/0101128 | A1 | 4/2013 | Lunner et al. | |
| 2013/0110521 | A1 | 5/2013 | Hwang et al. | |
| 2013/0132095 | A1 | 5/2013 | Murthi et al. | |
| 2013/0195288 | A1 | 8/2013 | Ye | |
| 2013/0223635 | A1 | 8/2013 | Singer et al. | |
| 2013/0301101 | A1 | 11/2013 | Conrad et al. | |
| 2013/0322215 | A1 | 12/2013 | Du et al. | |
| 2014/0003630 | A1 | 1/2014 | Demiya et al. | |
| 2014/0270197 | A1 | 9/2014 | Krishnamurthy et al. | |
| 2014/0270259 | A1 | 9/2014 | Goertz et al. | |
| 2014/0363010 | A1 | 12/2014 | Christopher et al. | |
| 2015/0049884 | A1 | 2/2015 | Ye | |
| 2015/0208165 | A1 | 7/2015 | Volk et al. | |
| 2015/0215698 | A1 | 7/2015 | Haiut | |
| 2015/0249881 | A1 | 9/2015 | Ruan et al. | |
| 2015/0256914 | A1 | 9/2015 | Wiesbauer et al. | |
| 2015/0271606 | A1 | 9/2015 | Grosh et al. | |
| 2015/0350774 | A1 | 12/2015 | Fürst et al. | |
| 2015/0350792 | A1 | 12/2015 | Grosh et al. | |
| 2016/0066113 | A1 | 3/2016 | Elkhatib et al. | |
| 2016/0314805 | A1 | 10/2016 | Mortazavi et al. | |
| 2017/0150254 | A1 | 5/2017 | Bakish et al. | |
| 2017/0214968 | A1 | 7/2017 | Braithwaite et al. | |
| 2017/0223450 | A1 | 8/2017 | Paton Alvarez et al. | |
| 2017/0238106 | A1 | 8/2017 | Theill | |
| 2017/0245076 | A1 | 8/2017 | Kusano et al. | |
| 2017/0263268 | A1 | 9/2017 | Rumberg et al. | |
| 2018/0352356 | A1 | 12/2018 | Amir | |
| 2019/0098417 | A1 | 3/2019 | Littrell et al. | |
| 2020/0296513 | A1 | 9/2020 | Littrell et al. | |
| 2020/0296530 | A1 | 9/2020 | Littrell | |
| 2020/0336841 | A1 | 10/2020 | Zeleznik et al. | |
| 2020/0408799 | A1 | 12/2020 | Littrell | |
| 2021/0193901 | A1 | 6/2021 | Umezawa et al. | |
| 2023/0308819 | A1 | 9/2023 | Littrell | |

FOREIGN PATENT DOCUMENTS

| | | | |
|---|---|---|---|
| CN | 104918178 | A | 9/2015 |
| JP | 2015206974 | A | 11/2015 |
| KR | 20140036790 | A | 3/2014 |
| WO | 2017151650 | | 9/2017 |

OTHER PUBLICATIONS

European Office Action in European Application No. EP17760637, dated Sep. 8, 2020, 5 pages.

Freedman D.S., et al., "An Analog VLSI Implementation of the Inner Hair Cell and Auditory Nerve Using a Dual AGC Model", IEEE Transactions on Biomedical Circuits and Systems, vol. 8, No. 2, Apr. 2014, pp. 240-256.

International Preliminary Report On Patentability—PCT/US2017/019996, The International Bureau of WIPO—Geneva, Switzerland, Sep. 13, 2018.

International Preliminary Report On Patentability—PCT/US2020/022973—The International Bureau of WIPO—Geneva, Switzerland—Sep. 23, 2021.

International Preliminary Report on Patentability—PCT/US2020/039746, The International Bureau of WIPO—Geneva, Switzerland, Jan. 6, 2022.

International Search Report and Written Opinion—PCT/US2017/019996—ISA/EPO—May 11, 2017.

International Search Report and Written Opinion—PCT/US2020/022932—ISA/EPO—Jun. 18, 2020.

International Search Report and Written Opinion—PCT/US2020/022973—ISA/EPO—Jun. 12, 2020.

International Search Report and Written Opinion—PCT/US2020/039746—ISA/EPO—Nov. 20, 2020.

International Search Report and Written Opinion—PCT/US2022/071834—ISA/EPO—Jun. 29, 2022.

Office Action for CN. Application. No. 201780026345, mailed May 20, 2020.

Office Action for CN. Application. No. 201780026345.6, mailed Mar. 18, 2021.

Supplementary European Search Report—EP17760637—Search Authority—The Hague—Jul. 23, 2019.

Supplementary European Search Report—EP20769410—Search Authority—Munich—Nov. 25, 2022.

"Anetode, Headphone Reviews", head-fi.org [online], 2011, retrieved on Apr. 23, 2021, retrieved from URL: https://www.head-fi.org/threads/why-does-it-matter-if-headphones-have-a-frequency-range-below-20hz-and-above-20khz.582802/, pp. 1-6.

Synopsys, Inc. "Synopsys and Sensory, Inc. Deliver Ultra-Low Power Voice Control Solution for Mobile, Automotive and Consumer Applications," 2015, 3 pages.

* cited by examiner

MICROPHONE HAVING A DIGITAL OUTPUT DETERMINED AT DIFFERENT POWER CONSUMPTION LEVELS

CLAIM OF PRIORITY

This present application is a continuation of U.S. patent application Ser. No. 18/126,938, filed Mar. 27, 2023, which is a continuation of U.S. patent application Ser. No. 16/819,673, filed May 16, 2020 which claims priority under 35 U.S.C. § 119(e) to U.S. Provisional Application No. 62/818,216 filed Mar. 14, 2019, the entire contents of which are incorporated herein by reference.

BACKGROUND

This disclosure relates generally to acoustic sensing and in particular to the use of sensors, such as microphones, in voice activated devices, such as smart speakers and other types of acoustic activated devices.

As the Internet of Things develops and more uses arise for acoustic-activated devices, one of the challenges with acoustic-activated devices is reducing power consumption. Generally, acoustic-activated devices sense acoustic signals (sound, vibration, etc.) that may occur over infrequent intervals. One approach to addressing power consumption of acoustic-activated devices is acoustic wake-up detection.

With acoustic wake-up detection, an acoustic detector circuit is included in the acoustic-activated device, and remains in an active state consuming power while a remaining portion of wake-up circuity and/or the acoustic-activated device are in an off or dormant state. Upon detection of an event by the acoustic detector circuit, the acoustic detector circuit generates a signal that causes power to be switched to the wake-up detection circuity and/or the acoustic-activated device. An acoustic detector circuit can also be an algorithm that is executed by a processor.

SUMMARY

Some approaches to acoustic wake-up detection can require a significant amount of data (e.g., 500 msec. of data more or less with current technologies) prior to the wake-word utterance being detected. If a threshold-based or a voice-detection-based wake-up system is used to turn on the analog-to-digital converter (ADC), digital signal processor (DSP), or other components of the acoustic-activated device, then the system may not be able to provide the necessary amount of data (e.g., 500 msec. of data) when the wake-word causes the system to wake up.

The need for this data prevents the use of many power-saving techniques because capturing this data necessitates an ADC and audio buffer. It is likely, however, that the data need not be of high quality relative to the remainder of the utterance. Significant power savings could be achieved by using a threshold-based or voice-detection-based wake-up to switch from a low power, low quality ADC to a higher quality, higher power ADC, with the data being constantly buffered to provide the necessary amount of data (e.g., 500 msec. or another time unit worth of data as called for by a particular application) prior to the wake-word utterance.

According to an aspect, a threshold detector circuit configured to receive a signal from an acoustic sensor element and produce an output signal to wake up an acoustically controlled device includes a switch having an input coupled to an output of the acoustic sensor element to receive an output signal from the acoustic sensor element, a control port that receives a control signal, and first and second output ports, a first analog-to-digital converter having an input coupled to the first output port of the switch and having an output to convert the output signal from the acoustic sensor element into a first digitized output signal, and which operates at a first power level, a second analog-to-digital converter having an input coupled to the second output port of the switch and having an output to convert the output signal from the acoustic sensor element into a second digitized output signal, and which operates at a second higher power level, relative to the first power level and a threshold level detector that receives an output from the first analog-to-digital converter to produce the control signal having a first state that causes the switch feed the output signal from the acoustic sensor element to the second analog-to-digital converter when the first digitized output signal meets a threshold criteria.

Some embodiments can include one or a combination of two or more of the following features.

The conversion circuit coupled between the outputs of the first analog-to-digital converter and the second analog-to-digital converter to format the first digitized output signal into an audio signal format and a buffer coupled to the outputs of the first analog-to-digital converter and the analog-to-digital converter configured to store either the first digitized output signal or the second digitized output signal according to the control signal. The threshold detector receives the output from the second analog-to-digital converter. The threshold detector produces the control signal with a second state that causes the switch to feed the output signal from the acoustic sensor element to the first analog-to-digital converter when the second digitized output signal drops below the threshold criteria. The threshold detector circuit is configured to provide an output signal from the first analog-to-digital converter or the second analog-to-digital converter to the acoustically controlled device. The acoustically controlled device is a sensor device. The acoustic sensor element is a MEMS piezoelectric-based microphone. The buffer stores a time unit worth of data. The first analog-to-digital converter is a successive approximation register type of analog-to-digital converter and the second is a Sigma-Delta type of analog-to-digital converter. The microphone is a MEMS microphone and the threshold detector is a voice activity detector configured to detect when an input, audio signal has an amplitude above a threshold amplitude. The microphone is a MEMS piezoelectric microphone and the threshold detector is a voice activity detector configured to detect when an input, audio signal has an amplitude above a threshold amplitude.

According to an additional aspect, a threshold detector circuit is configured to receive an input signal from an acoustic sensor element and produce an output signal to wake up an acoustically controlled device, and includes a switch having an input coupled to the output of the acoustic sensor element to receive an output signal from the acoustic sensor element, a control port that receives a control signal, and first and second output ports, a first channel comprising an energy level per band detector circuit that partitions the output signal from the acoustic sensor element into frequency bands and buffers the energy level per band, a second channel comprising an analog-to-digital converter having an input coupled to the second output port of the switch and having an output to convert the output signal from the acoustic sensor element into a second digitized output signal, and which operates at a second higher power level, relative to the first power level, a threshold level detector that receives an output from the first channel to produce the control signal having a first state that causes the switch to feed the output signal from the acoustic sensor element to the second analog-to-digital converter when the first digitized output signal meets a threshold criteria.

Some embodiments can include one or a combination of two or more of the following features.

The energy level per band is calculated in frames in time. The threshold detector circuit includes one or more buffer circuits. The first channel provides a precursor for calculating Mel-frequency cepstrum coefficients. The threshold detector circuit further includes a wake on sound signal detection circuit. The threshold detector circuit further includes a set of filter banks having a plurality of frequency bands sized using Mel-frequency scale.

According to an additional aspect, an acoustic device includes an acoustic sensor element configured to sense acoustic energy and produce an output signal, a threshold detector circuit configured to receive an input signal from an acoustic device and produce an output signal to wake up an acoustically controlled device includes a switch having an input coupled to the output of the acoustic device to receive an output signal from the acoustic device, a control port that receives a control signal, and first and second output ports, a first analog-to-digital converter having an input coupled to the first output port of the switch and having an output to convert the output signal from the acoustic sensor element into a first digitized output signal, and which operates at a first power level, a second analog-to-digital converter having an input coupled to the second output port of the switch and having an output to convert the output signal from the acoustic sensor element into a second digitized output signal, and which operates at a second higher power level, relative to the first power level and a threshold level detector that receives an output from the first analog-to-digital converter to produce the control signal having a first state that causes the switch to feed the output signal from the acoustic sensor element to the second analog-to-digital converter when the first digitized output signal meets a threshold criteria.

Some embodiments can include one or a combination of two or more of the following features.

The conversion circuit coupled between the outputs of the first analog-to-digital converter and the second analog-to-digital converter to format the first digitized output signal into an audio signal format and a buffer coupled to the outputs of the first analog-to-digital converter and the analog-to-digital converter configured to store either the first digitized output signal or the second digitized output signal according to the control signal.

The threshold detector receives the output from the second analog-to-digital converter. The threshold detector produces the control signal with a second state that causes the switch to feed the output signal from the acoustic sensor element to the first analog-to-digital converter when the second digitized output signal drops below the threshold criteria. The threshold detector is configured to provide an output signal from the first analog-to-digital converter or the second analog-to-digital converter to an acoustically actuated device. The acoustically actuated device is a sensor device. The acoustically actuated device is a MEMS piezoelectric-based microphone. The buffer stores a time unit worth of data. The first analog-to-digital converter is a successive approximation register type of analog-to-digital converter and the second is a Sigma-Delta type of analog-to-digital converter. The microphone is a MEMS microphone and the threshold detector is a type of detector to determine if the signal has information of interest. This detector could be a threshold detector, a voice activity detector, a sound energy detector, etc. The acoustic sensor element is a MEMS piezoelectric microphone and the threshold detector is implemented as a voice activity detector configured to detect when an input, audio signal has an amplitude above a threshold amplitude and information of interest, and the microphone is packaged with the voice activity detector in a hybrid circuit configuration.

According to an additional aspect, an acoustic device includes an acoustic sensor element configured to sense acoustic energy and produce an output signal and a threshold detector circuit a threshold detector circuit is configured to receive an input signal from an acoustic device and produce an output signal to wake up an acoustically controlled device, and includes a switch having an input coupled to the output of the acoustic sensor element to receive the output signal, a control port that receives a control signal, and first and second output ports, a first channel comprising an energy level per band detector circuit that partitions the output signal into frequency bands and buffers the energy level per band, a second channel comprising an analog-to-digital converter having an input coupled to the second output port of the switch and having an output to convert the output signal from the acoustic sensor element into a second digitized output signal, and which operates at a second higher power level, relative to the first power level, a threshold level detector that receives an output from the first channel to produce the control signal having a first state that causes the switch to feed the output signal from the acoustic sensor element to the second analog-to-digital converter when the first digitized output signal meets a threshold criteria.

Some embodiments can include one or a combination of two or more of the following features.

The energy level per band is calculated in frames in time. The threshold detector circuit includes one or more buffer circuits. The first channel provides a precursor for calculating Mel-frequency cepstrum coefficients. The threshold detector circuit further includes a wake on sound signal detection circuit. The threshold detector circuit further includes a set of filter banks having a plurality of frequency bands sized using Mel-frequency scale. The acoustic sensor element is a MEMS piezoelectric microphone and the threshold detector is a voice activity detector configured to detect when an input, audio signal has an amplitude above a threshold amplitude, and the microphone is packaged with the voice activity detector in a hybrid circuit configuration.

The details of one or more embodiments of the disclosure are set forth in the accompanying drawings and the description below. Other features, objects, and advantages of the disclosure will be apparent from the description and drawings, and from the claims.

DETAILED DESCRIPTION

Piezoelectric devices have an inherent ability to be actuated by stimulus even in the absence of a bias voltage due to the so called "piezoelectric effect" that cause a piezoelectric material to segregate charges and provide a voltage potential difference between a pair of electrodes that sandwich the piezoelectric material. This physical property enables piezoelectric devices to provide ultra-low power detection of a wide range of stimulus signals.

Micro Electro-Mechanical Systems (MEMS) can include piezoelectric devices and capacitive devices. Microphones fabricated as capacitive devices require a charge pump to provide a polarization voltage whereas piezoelectric devices do not require a charge pump. The charge generated by the piezoelectric effect is generated due to stimulus causing mechanical stress in the material. As a result, ultra-low power circuits can be used to transfer this generated charge through simple gain circuits.

Figure 1:
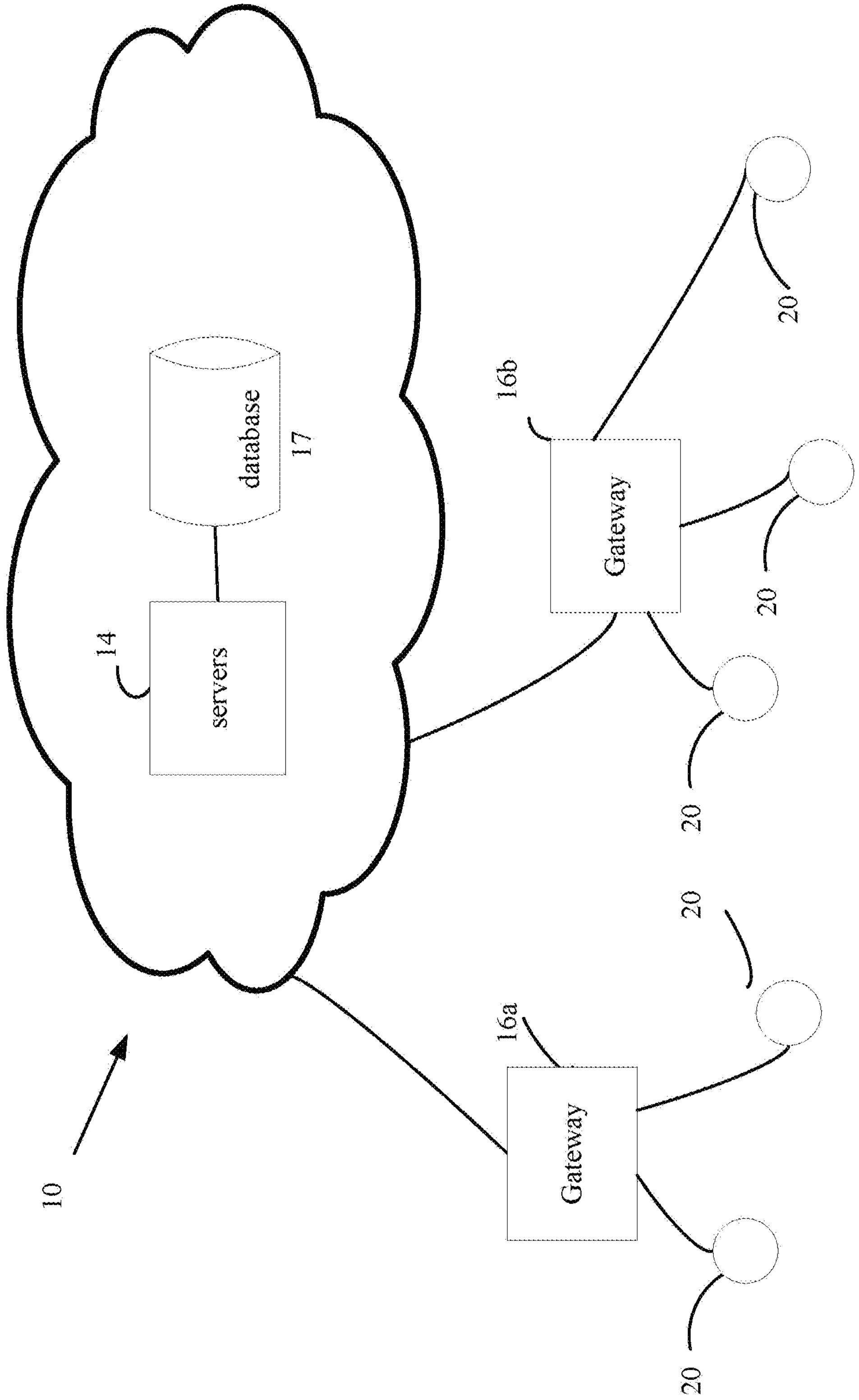
FIG. 1 is a block diagram of an exemplary networked system.

Referring now to FIG. 1, an exemplary distributed network architecture 10 for interconnecting Internet of Things devices 20 that have embedded processors and that are acoustically activated is shown. The distributed network architecture 10 embodies principles pertaining to the so called "Internet of Things" (IoT), a term that refers to the interconnection of uniquely identifiable devices 20 that may be sensors, detectors, appliances, process controllers, smart speakers and so forth. In the context of FIG. 1, the devices 20 are voice-detection-based systems that wake up upon detection of acoustic energy. These devices include a threshold-based or voice-detection-based wake-up circuity.

The distributed network architecture 10 includes gateways 16 located at central, convenient places inside, e.g., individual buildings and structures. These gateways 16 communicate with servers 14 whether the servers are standalone dedicated servers and/or cloud based servers running cloud applications using web programming techniques. Generally, the servers 14 also communicate with databases 17. The servers are networked together using well-established networking technology such as Internet protocols or which can be private networks that use none or part of the Internet. The details of the distributed network 10 and communications with these devices 20 are well known.

Figure 2:
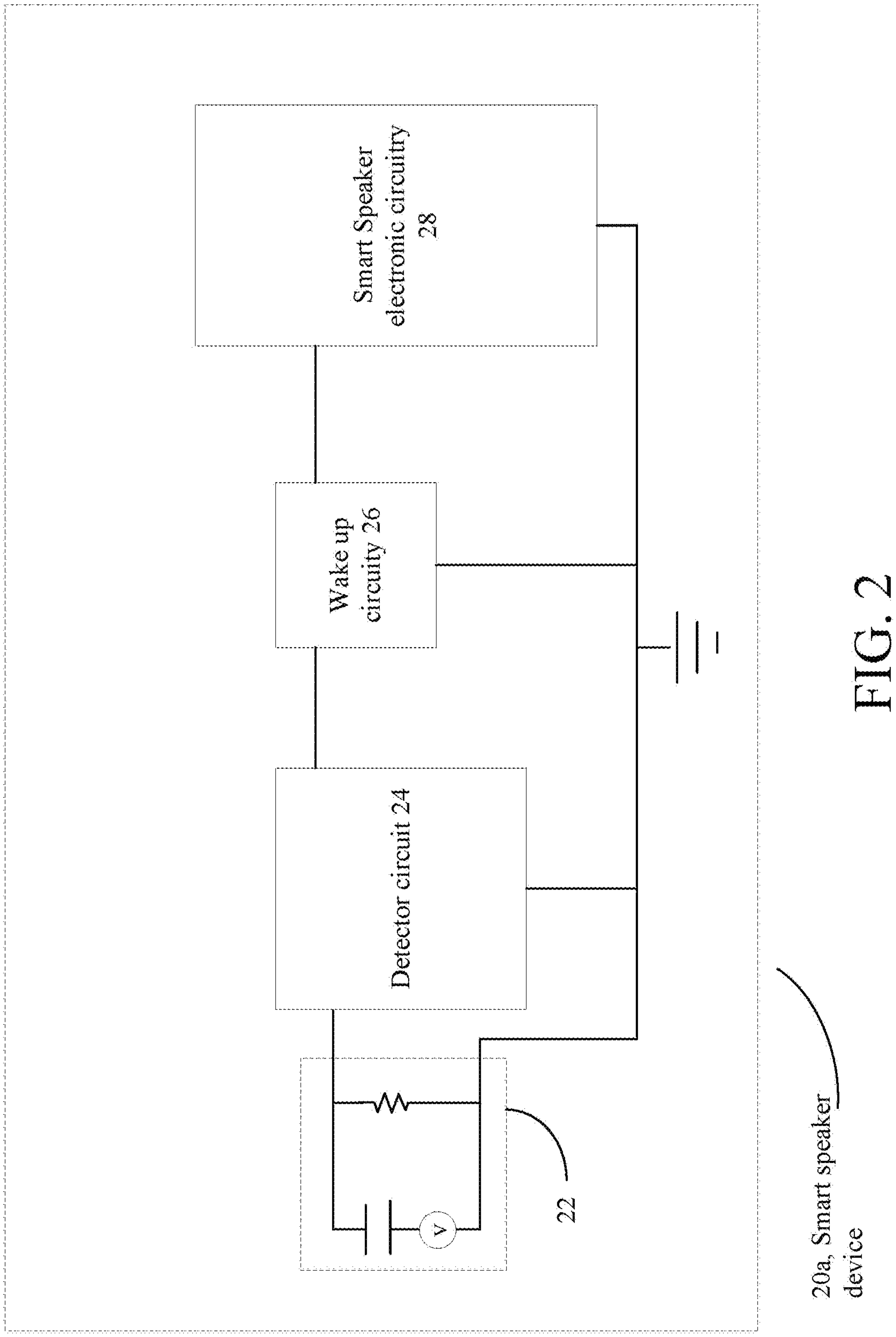
FIG. 2 is a block diagram of an exemplary smart speaker.

Referring now to FIG. 2, an exemplary IoT device 20*a* is shown. The IoT device 20*a* is a so called smart speaker (hereinafter smart speaker 20*a*) and includes a microphone 22, an acoustic threshold detector circuit 24 and wake up circuit 26 that receives a signal ($S_{OUT}$) from the acoustic threshold detector circuit 24. The smart speaker 20*a* also includes smart speaker electronic circuity 28 that is part of the overall smart speaker 20 and which includes various circuits, not explicitly shown, such as circuity to respond to names to wake up the smart speaker 20*a*, computing circuity for voice interaction, music playback, setting alarms, streaming podcasts, and playing audiobooks, in addition to providing weather, traffic and other real-time information from the Internet. The smart speaker 20*a* in some implementations can control other devices, thus acting as a home automation hub. The smart speaker 20*a* has circuity to connect (wired and/or wirelessly) to the Internet, as well as short distance communication, e.g., Bluetooth, etc. to connect to other like-enabled devices.

Figure 3:
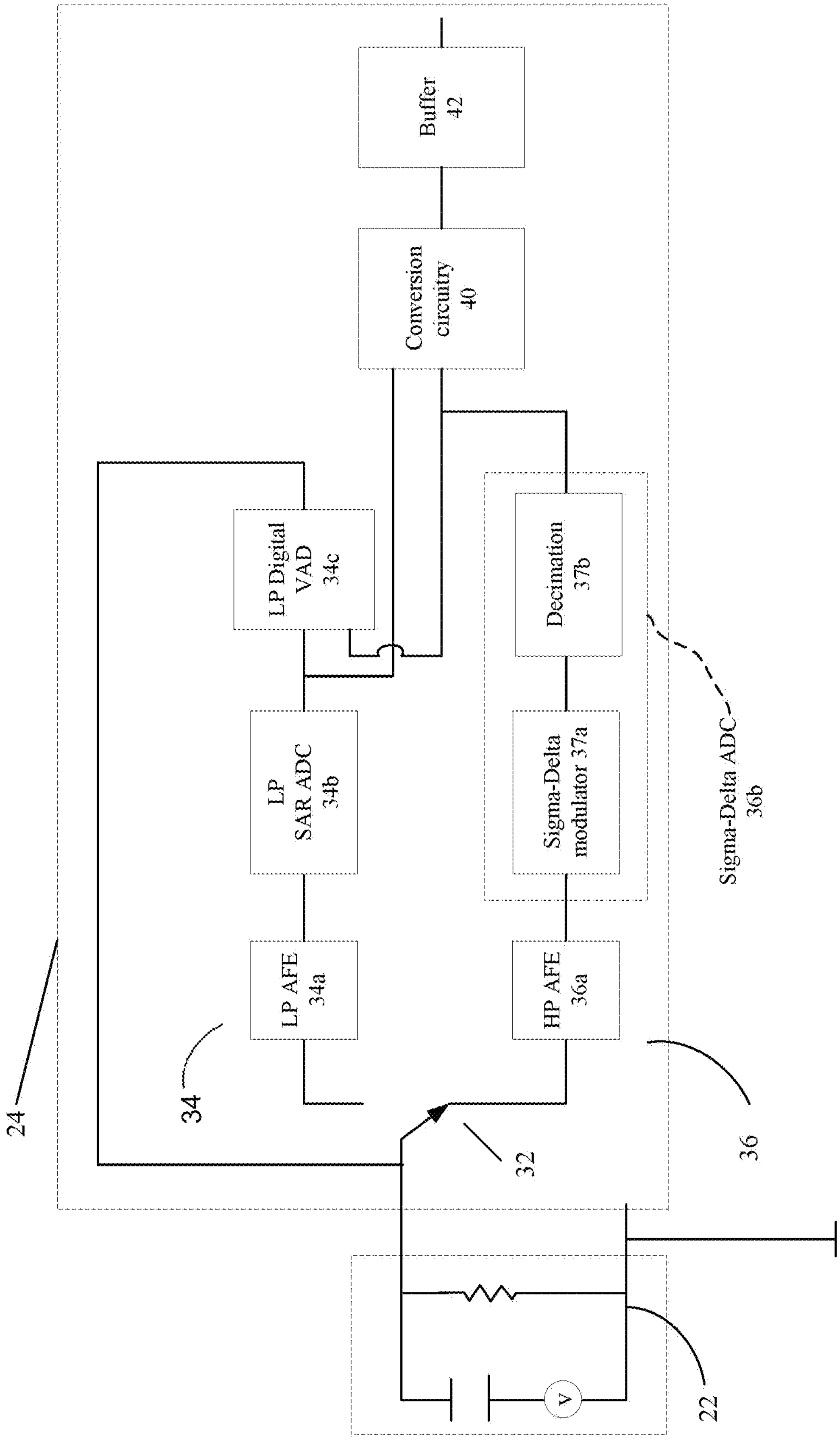
FIGS. 3-7 are block diagrams of exemplary detector circuits.

Referring now to FIG. 3, the microphone 22 and the detector circuit 24 are shown in detail. In one embodiment, the microphone 22 is a piezoelectric based microphone. More specifically, the microphone 22 is a MEMS (Micro Electro-Mechanical Systems) piezoelectric microphone that is fabricated on a die. The MEMS piezoelectric based microphone 22 is represented in FIG. 2 by an equivalent circuit of a capacitor in series with a voltage source, which are shunted by a resistor. The voltage source represents an equivalent voltage that is produced from the piezoelectric element(s) responding to acoustic energy. The capacitor and resistor represent an equivalent capacitance and equivalent resistance of the MEMS piezoelectric based microphone 24. In some embodiments the MEMS piezoelectric based microphone 24 is coupled to the detector circuit 24 and in other embodiments the MEMS piezoelectric based microphone 24 is hybrid-integrated with the detection circuit 24.

The threshold detection circuit 24 includes a switch 32 that has an input coupled to an output of the MEMS piezoelectric based microphone 24 (in FIG. 3 a single pole double throw action type switch). The switch 32 also has a first output that is coupled to a first channel 34 and a second output that is coupled to a second channel 36. The switch 32 also has a control port that is fed a control signal to control the switch 32 to couple the input to the first output or the second output of the switch 32.

The first channel 34 includes a first analog front end 34*a*, a successive approximation register based analog to digital converter (SAR ADC) 34*b* and a digital voltage level detector 34*c*. The first analog front end 34*a* has an output coupled to an input to the SAR ADC 34*b*. An output of SAR ADC 34*b* is coupled to an input to the digital voltage level detector 34*c*. Each of the first analog front end 34*a*, the successive approximation register based analog to digital converter SAR ADC 34*b* and the digital voltage level detector 34*c* are ultra-low power devices. SAR ADC 34*b* is a type of ADC that converts a continuous input analog signal into a digital representation using a binary search across all quantization levels to converge on a digital output at each conversion. This approach introduces a quantization error and quantization noise. However, SAR ADCs are generally much lower power consuming devices than other more accurate ADCs such as Sigma-Delta ADCs.

In some embodiments the digital voltage level detector 34*c* is an amplitude detector. That is, the digital voltage level detector 34*c* can measure when an amplitude of the digital data from the SAR ADC 34*b* meets or exceeds a threshold over an increment(s) of time. In other embodiments, the threshold detector is a voice activity detector configured to detect when an input, audio signal has a frequency with a band threshold frequency that would correspond to voice (e.g., 20 HZ to 20,000 Hz.). See for example U.S. Patent Application Ser. No. 62/818,140, filed on Mar. 14, 2019, titled "A Piezoelectric MEMS Device with an Adaptive Threshold for Detection of an Acoustic Stimulus," the entire content of which is incorporated herein by reference. That is, the digital voltage level detector 34*c* could be a threshold detector, a voice activity detector (VAD), or one of many other types of detectors used to determine if there is a signal of interest. For example, a VAD algorithm may determine a ratio of signal energy to zero crossings (signal excursions between positive and negative levels) over a time interval. High levels of energy with few zero crossings indicates that the signal is more likely to be voice, whereas low and/or high levels of energy with many zero crossings indicate that the signal is more likely to be noise. For those systems that perform different functions from detecting speech as the signal of interest, other types of detection schemes may be used.

The second channel 36 includes a second analog front end 36*a* and a Sigma-Delta ADC (S-D ADC) 36*b*. The S-D ADC 36*b* includes a Sigma-Delta modulator 37*a* and a digital filter also commonly referred to as a decimation circuit 37*b*. An output of the decimation circuit 37*b* (e.g., output of the ADC S-D ADC 36*b*) is coupled to the input of the digital voltage level detector 34*c*. The components in second channel 36, in particular the SD ADC 36*b* and possibly the second analog front end 36*a*, will typically consume higher levels of power than the components in the first channel 34. Use of a conventional SD ADC 36*b* in the second channel 36 allows the input analog signal received from the analog front end 36*a* to undergo delta modulation where the change (e.g., the delta) in the signal is encoded, rather than the absolute value of the signal, producing a stream of pulses that are passed through a 1-bit DAC and which are added (sigma) to the input signal before delta modulation.

The SD ADC 36*b* has a significantly reduced quantization error, e.g., quantization error noise, which is a common occurrence for the simpler and low power types of ADCs such as the SAR ADC 34*b*. Thus, channel 34 will have a higher quantitation error and thus quantization noise, albeit at lower power levels than channel 36.

Both channel 34 and channel 36 have signal outputs that are fed to a conversion circuit 40 that converts the digital signals received from either channel 34 or channel 36, depending on a state of the control signal from VAD 34*c*, as applied to switch 32) into a typical digital audio format. The conversion circuit 40 has an output that feeds a buffer 42. Buffer 42 stores a time-unit worth of the digitized acoustic signal ($S_{OUT}$) captured by the microphone 22. In quiet environments, the output signal from the microphone 22 is coupled to the channel 34 (low-power channel relative to channel 36). The output signal is processed by channel 34 and the digitized, converted output signal from channel 34 is stored or buffered for a time unit worth of data, e.g., 500 msec. worth of data.

The digitized output signal from SAR ADC 34*b* is fed into the digital voltage level detector 34*c* and when the digital voltage level detector 34*c* determines that voice or high ambient acoustics are present, the digital voltage level detector 34*c* changes the state of the control signal to cause the switch 32 to switch to channel 36 and the SD ADC 36*b* to provide better quality audio than channel 34 and SAR ADC 34*b*.

On the other hand, the digitized output signal from the SD ADC 36*b* is also fed into the digital voltage level detector 34*c* and when the digital voltage level detector 34*c* determines that voice or high ambient acoustics are no longer present, the digital voltage level detector 34*c* again changes the state of the control signal to cause the switch 32 to switch to channel 34 and SAR ADC 34*b* to provide lower power dissipation albeit a lower quality audio than channel 36 and SD ADC 36*b*.

The reference to low power and relatively high power does not require or imply that a high power consuming SD ADC 36*b* should be used. Rather, it is understood that for a given set of requirements for a particular application the lowest possible power dissipation would be used for all components taking into consideration performance and cost criteria. However, it is clear that given the nature of a typical SAR ADC 34*b* and a typical SD ADC 36*b* that due to its principals of operation and complexity a typical SD ADC 36*b* would in general consume more power than a typical SAR ADC 34*b* for a given resolution. Thus, all components can be low power components.

Figure 4:
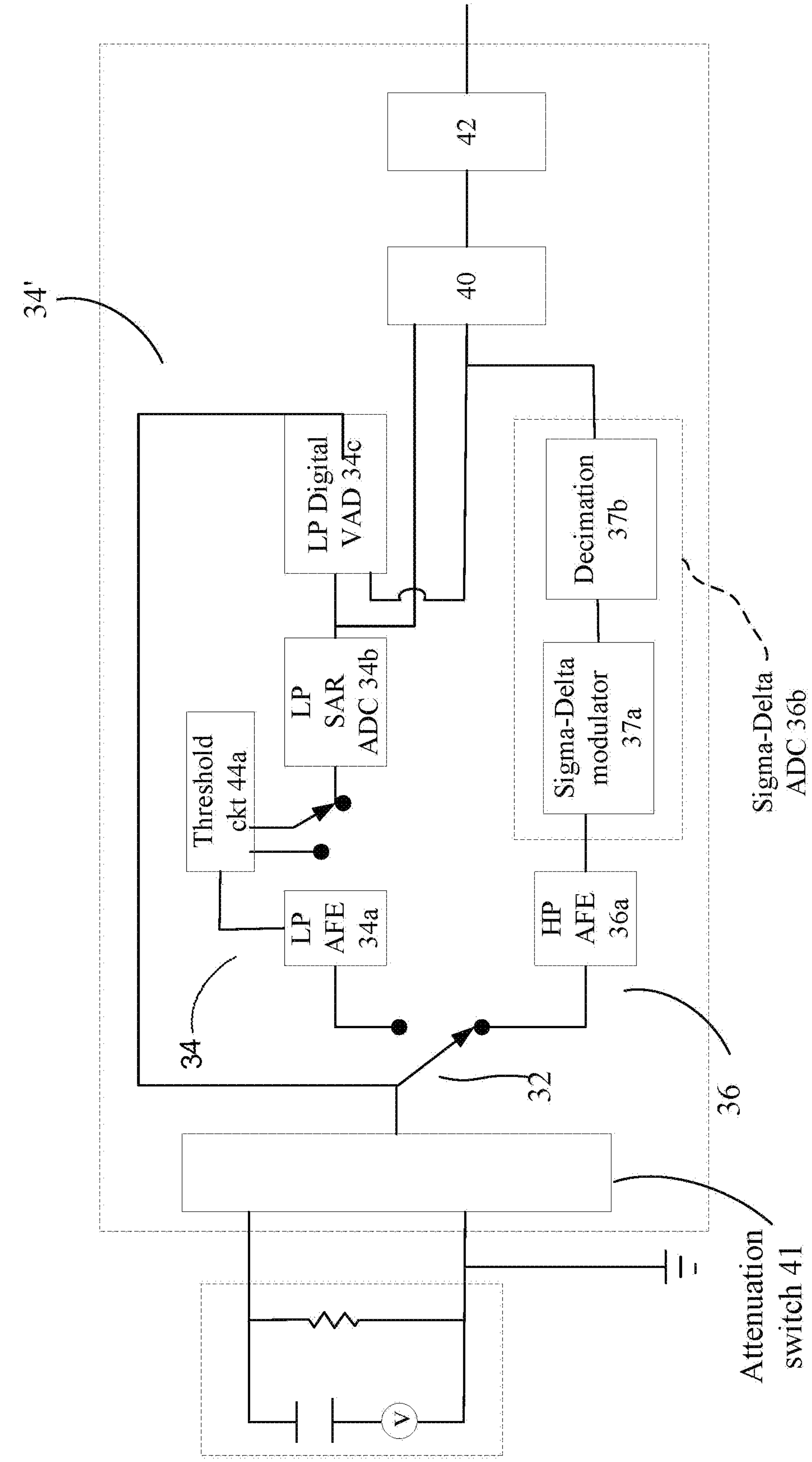

Referring now to FIG. 4, an alternative embodiment of the detection circuit is shown. The microphone 22, e.g., a piezoelectric-based microphone, and an alternative detector circuit 44 are shown in detail.

The threshold detection circuit 24 includes an attenuation switch 41 that attenuates the output signal from the microphone 22 (e.g., by a fixed amount of decibels), as well as the switch 32 (e.g., a single pole double throw action type switch, as in FIG. 3). The switch 32, however, is interposed between attenuation switch 41 and an alternative first channel 34' and the second channel 36. The switch 32 otherwise operates similar to that described in FIG. 3 having the control port fed the control signal from the digital voltage level detector 34*c*.

The first channel 34' includes the first analog front end 34*a* (e.g., as in FIG. 3), a threshold circuit 44*a*, the SAR ADC 34*b* (e.g., as in FIG. 3), and the digital voltage level detector 34*c* (e.g., as in FIG. 3). The first channel 34' includes the threshold circuit 44*a* that can be used to “gate” the SAR ADC 34*b*, to operate when the output signal from the front end 34*a* exceeds a threshold value.

The second channel 36 includes the second analog front end 36*a* and the S-D ADC 36*b* that includes the Sigma-Delta modulator 37*a* and the digital filter also commonly referred to as a decimation circuit 37*b*. The output of the decimation circuit 37*b* (e.g., output of the ADC S-D ADC 36*b*) is coupled to the input of the digital voltage level detector 34*c*, as in FIG. 3. As in FIG. 3, the components in second channel 36, in particular the SD ADC 36*b*, and possibly the second analog front end 36*a*, will typically consume higher levels of power than the components in the first channel 34.

Both channel 34' and channel 36 have signal outputs that are fed to the conversion circuit 40 that converts the digital signals received from either channel 34' or channel 36, depending on a state of the control signal from VAD 34*c*, as applied to the switch 32, into a typical digital audio format. The conversion circuit 40 has an output that feeds a buffer 42 that buffers a time unit worth of data, e.g., 500 msec. worth of data, ($S_{OUT}$), as discussed above.

The digitized output signal from SAR ADC 34*b* is fed into the digital voltage level detector 34*c*. When the digital voltage level detector 34*c* determines that voice or high ambient acoustics are present, the digital voltage level detector 34*c* changes the state of the control signal to cause the switch 32 to switch to channel 36 and the SD ADC 36*b* to provide better quality audio than channel 34' and SAR ADC 34*b*, as discussed for FIG. 3. When the digital voltage level detector 34*c* determines that voice or high ambient acoustics are no longer present, the digital voltage level detector 34*c* again changes the state of the control signal to cause the switch 32 to switch to channel 34' and SAR ADC 34*b* to provide lower power dissipation albeit a lower quality audio than channel 36 and SD ADC 36*b*, as discussed above for FIG. 3.

Figure 5:
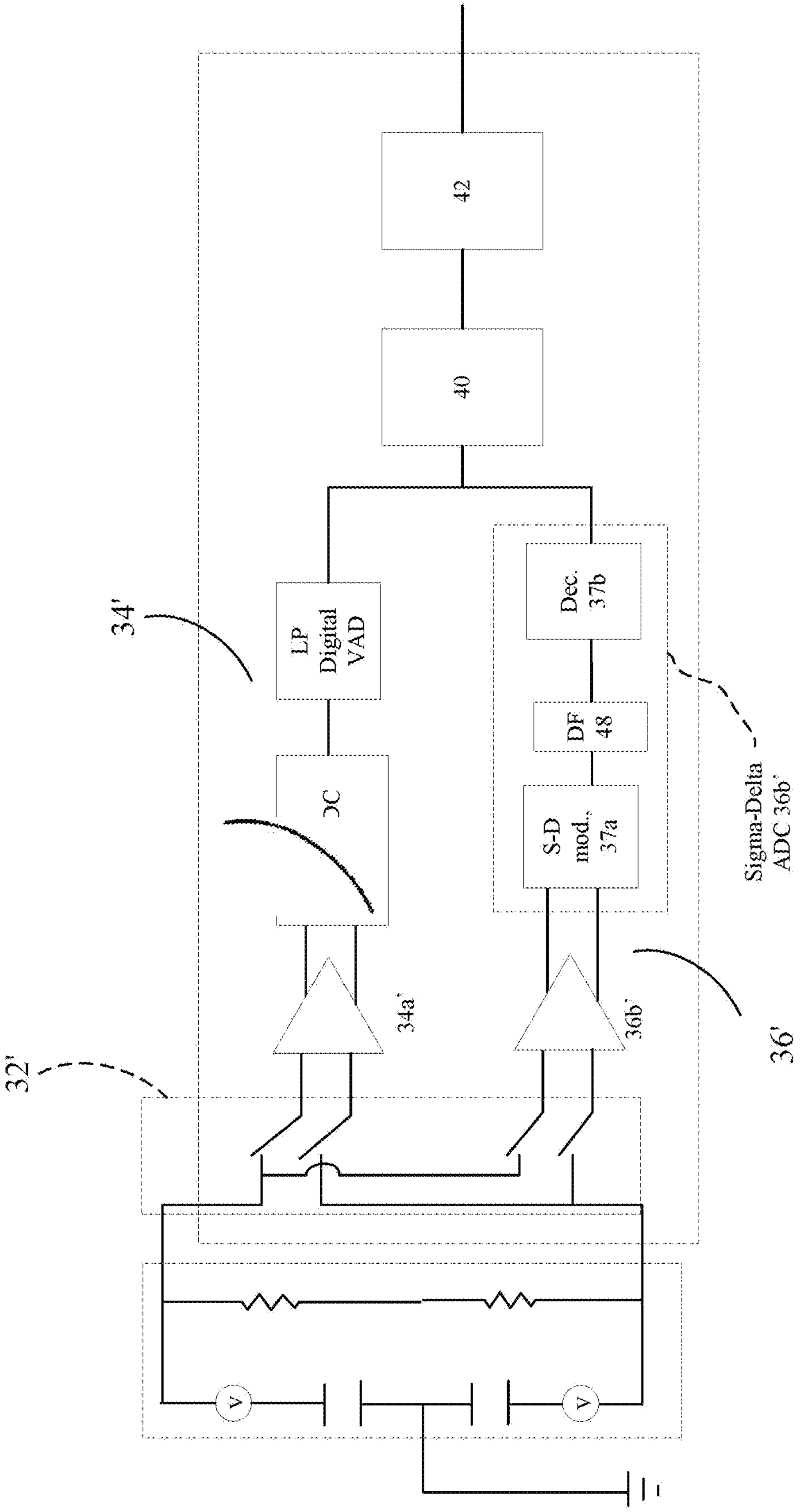

Referring now to FIG. 5, another alternative embodiment of the detection circuit is shown. In this embodiment, there is a pair of microphones 22*a*, 22*b* arranged in a differential configuration 23, with the differential configuration 23 having reference lines coupled to a reference potential and output lines each coupled to a switch arrangement 32' that is a double pole double throw configuration.

The switch arrangement 32' has a pair of inputs that receive output signals from the pair of microphones 22*a*, 22*b*. The switch arrangement 32' also has two pairs of outputs that are coupled to an alternative first analog front end 34*a'* and an alternative second analog front end 36*a'*, each of which have differential inputs. The switch arrangement 32' determines whether the signals from the switch arrangement 32' are fed to the alternative first analog front end 34*a'* or the alternative second analog front end 36*a'*. An SD ADC 36*b'* can have differential inputs and an SD ADC 36*b'* can include a digital filter 48 interposed between the Sigma-Delta modulator 37*a* and the decimation circuit 37*b* to attenuate output from the SD ADC 36*b*, for output that is above a bandwidth of interest according to the application of the circuit. The detection circuit includes the conversion circuit 40 that has an output that feeds the buffer 42 that buffers a time unit worth of data, e.g., 500 msec. worth of data, ($S_{OUT}$), as discussed above.

Figure 6:
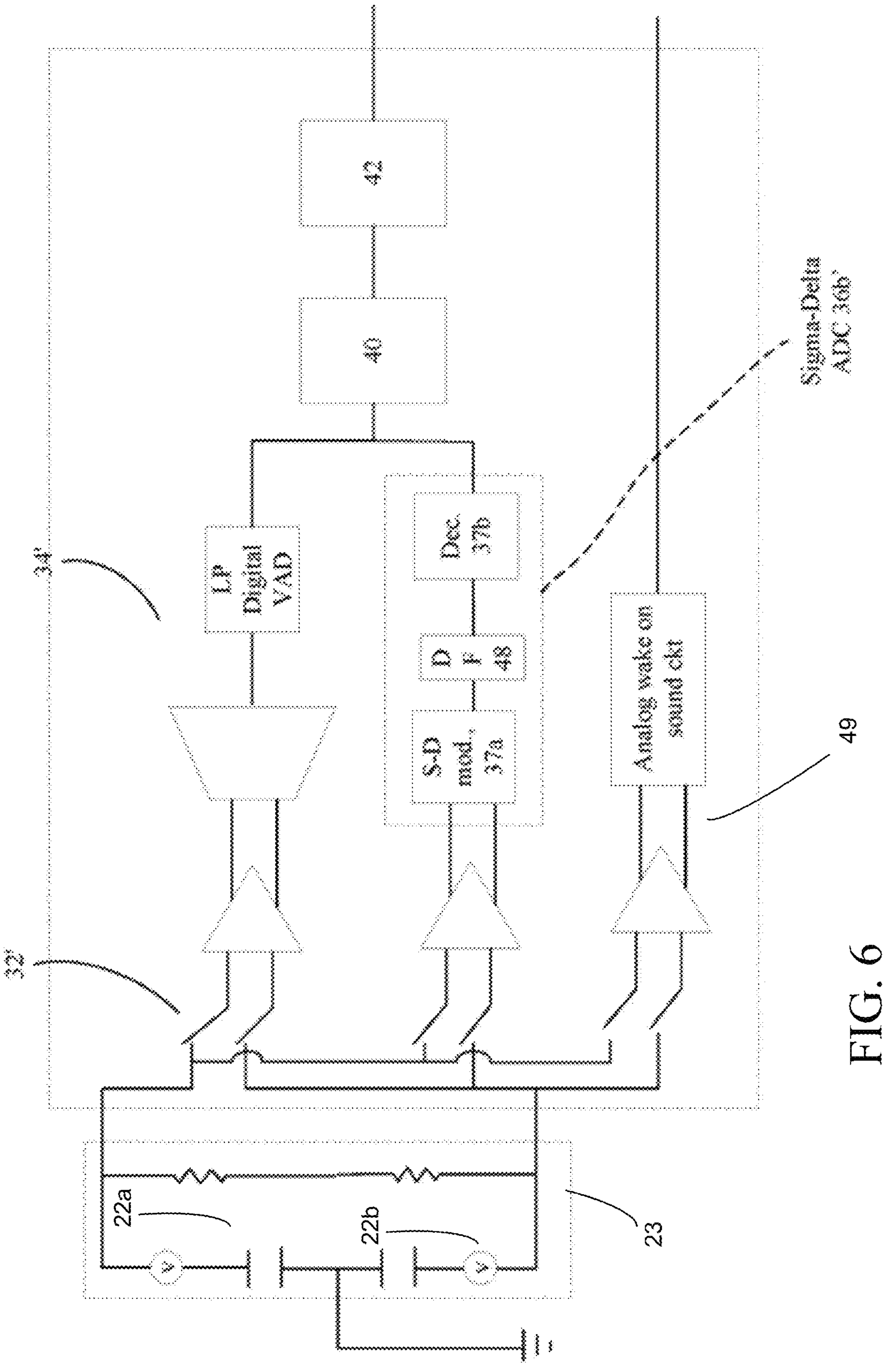

Referring now to FIG. 6, another alternative embodiment of the detection circuit is shown. In this embodiment, there is the pair of microphones 22*a*, 22*b* arranged in a differential configuration 23 (FIG. 5) coupled to the alternative first analog front end 34*a*' and the alternative second analog front end 36*a*', as in FIG. 5.

FIG. 6 includes a third channel 49 that can accommodate an analog wake on sound circuits. One example is of the type disclosed in co-pending applications U.S. patent application Ser. No. 16/081,015, filed on Aug. 29, 2018, titled "A Piezoelectric Mems Device for Producing a Signal Indicative of Detection of an Acoustic Stimulus," and U.S. Patent Application Ser. No. 62/818,140, filed on Mar. 14, 2019, titled "A Piezoelectric MEMS Device with an Adaptive Threshold for Detection of an Acoustic Stimulus," both of which are incorporated herein by reference in their entirety, and each of which provide an output signal ($D_{OUT}$), as mentioned in those applications.

Figure 7:
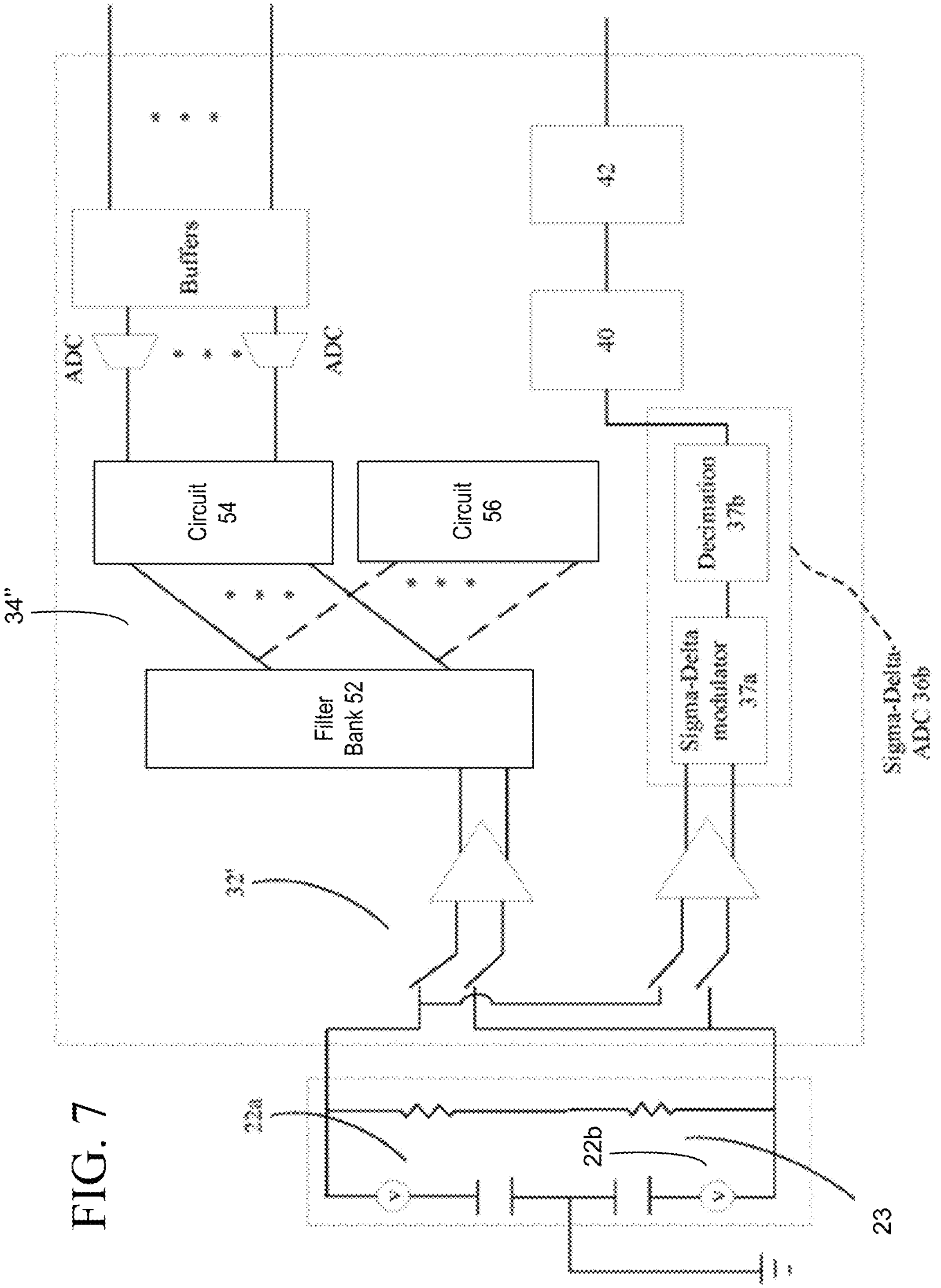

Referring now to FIG. 7, another alternative embodiment of the detection circuit is shown. In this embodiment, there is the channel 36 (see FIG. 4) that provides signal $S_{OUT}$ and another alternative channel 34" that provide signals $S_{OUTa}$ to $S_{OUTn}$. Channel 34" includes the alternative first analog front end 34*a*' (e.g., as in FIG. 5), filter bank 52, an energy level per band detector circuit 54 and a wake on sound signal detection circuit 56. Instead of digitizing the output signal from the microphones 22*a*, 22*b* by using a SAR ADC (e.g., as in FIGS. 5 and 6) on the whole signal, the channel 34" includes the filter bank 52 that partitions the output signal into frequency bands, and the energy level per band detector circuit 54 calculates the energy level per band in frames or windows of time (e.g., every 20 msec.). These values are fed to an analog-digital converters per band, and outputs from the analog-digital converters are stored in buffers per band to buffer the energy level per band signals. The energy level per band signals are calculated in frames in time, such as every 20 msec.

By saving (buffering) in this format, channel 34" provides a precursor for calculating the Mel-frequency cepstrum coefficients (MFCCs) to compress an audio signal. In a typical digital system, MFCCs would be computed for every 20 msec. interval, providing basically an average of the square of the voltage over that interval. In the system of FIG. 7, the square operation could occur first, and then the system could calculate the average over a time interval (to use the instantaneous information for the wake-up algorithm) or use the same order of operations in the typical digital system. The wake-on-sound signal detection circuitry acts on the bands using, for example, the detection scheme described in the above provisional application.

The conversion to MFCCs can also compress the audio signal. This conversion is done by first framing the signal into short frames (e.g., 25 msec.), applying a discrete Fourier transform (DFT) to the framed signal to transform the signal into separate frequency bands corresponding to the so called Mel-frequency scale, and computing the natural log (log) of the signal energy in each Mel-frequency band. The conversion also involves computing the discrete cosine transform (DCT) of the new signal (energy levels in a series of bands), and in some instances, removing higher coefficients and keeping remaining coefficients as the MFCCs.

Thus, the filter banks in FIG. 7 could be sized using the Mel-frequency scale and, in that case, FIG. 7 would be depicting a set of operations that is functionally equal to the first several steps of the MFCC conversion. If the output was converted to a log scale, it may be more efficient to store in the buffer (a better representation of the signal could be stored with fewer bits). Because MFCCs are commonly used in speech recognition systems, the stored MFCCs, rather than the original audio signal, could then be transmitted and used by the rest of the system.

Figure 7A:
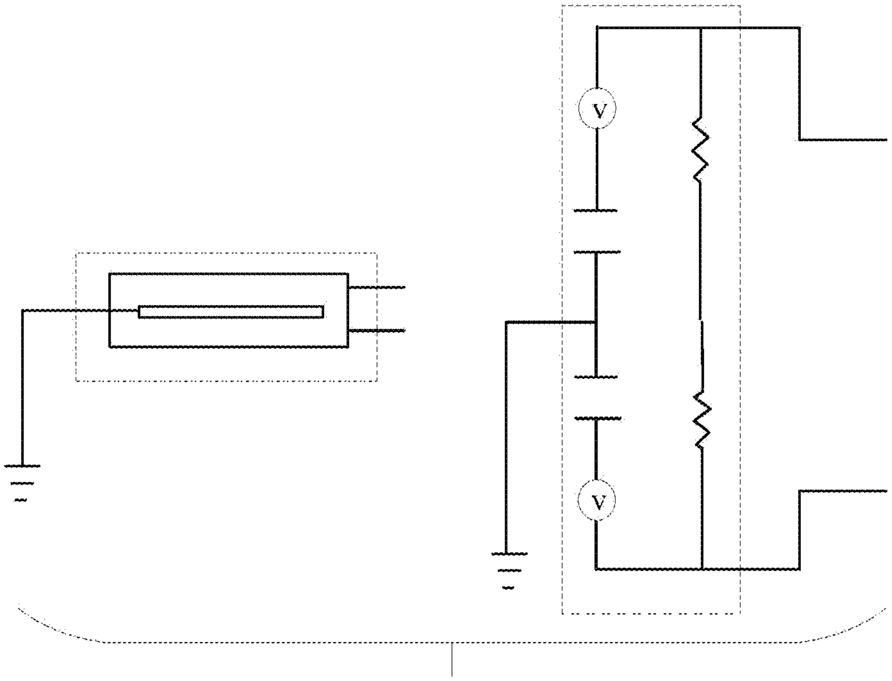
FIG. 7A is a schematic diagram of a single microphone and equivalent circuit.

Referring now to FIG. 7A a single microphone having a set of differential outputs is shown as an alternative to the microphone of FIG. 7.

As mentioned above, the switch 32 (or 32') receives a control signal from the digital voltage level detector 34*c* that switches the state of the control signal according to outputs from each of channel 34, 36.

Figure 8:
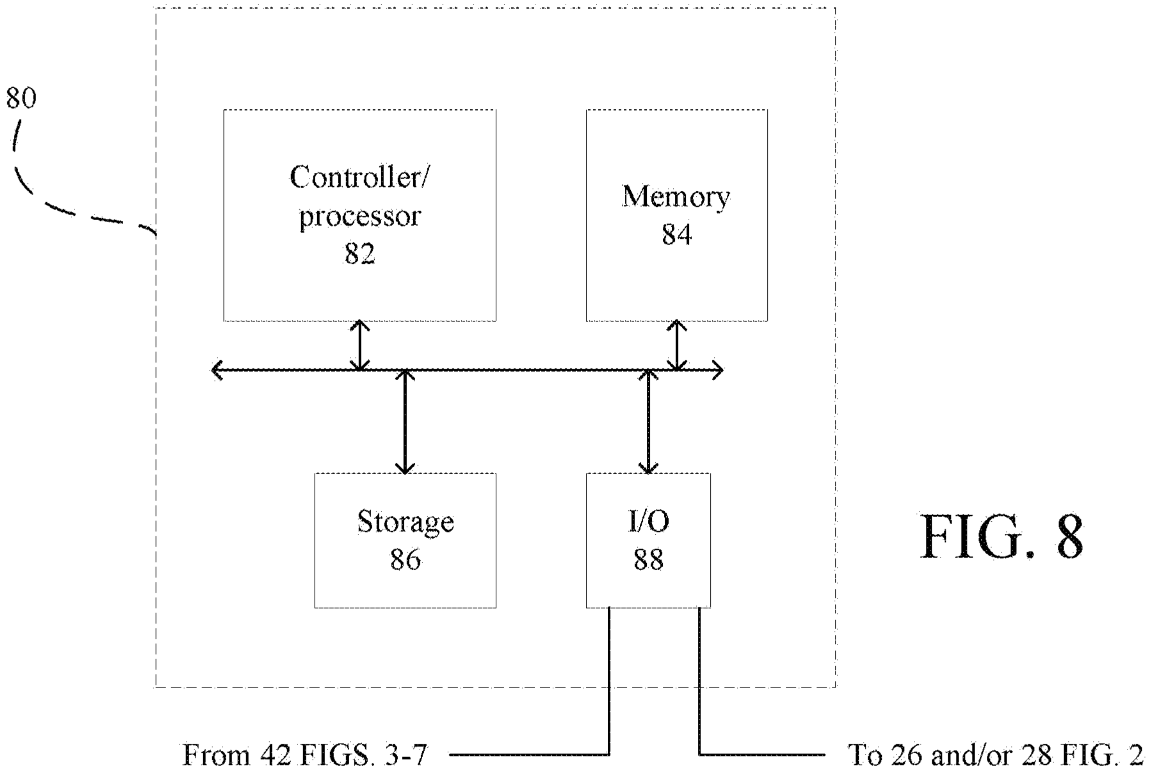
FIG. 8 is a block diagram of an exemplary processing circuit.

As an alternative, the switch 32 (or 32') receives a control signal from a processing device (e.g., processing device 80 shown FIG. 8). The process device starts with the control signal in a first state that causes the output from the microphone 22 to feed the first channel 34 having SAR ADC 34*b*. The processing device analyzes SAR ADC signal at the output and determines when the output signal reaches or exceeds a signal level having a magnitude of interest. If a signal having a magnitude of interest is present, the processing device changes the state of the control signal to a second state that causes the output from the microphone 22 to feed the second channel 36 having SD ADC 36*b*.

The process will again change the state of the control signal back to the first state to cause the output from the microphone 22 to feed the first channel 34 having SAR ADC 34*b*, after a period of time has elapsed where the processing device did not detect any signal of interest.

As another alternative, the switch 32 (or 32') receives a control signal that is determined from the processing device and the wake-on-sound circuit of FIG. 6.

As another alternative, in the circuit of FIG. 7, instead of buffering the actual audio signal, the signal is filtered into bands and these bands can be used for the wake-on-sound signal detection circuit and these bands can also be used to generate the data to be buffered.

Referring now to FIG. 8, an example of an embedded processing device 80 that can be used to process the digitized outputs from the buffer 42 is shown. The processing device 80 includes a processor/controller 82, that can be an embedded processor, a central processing unit or fabricated as an ASIC (application specific integrated circuit), etc. The processing device 80 also includes memory 84, storage 86 and I/O (input/output) circuitry 88, all of which are connected to the processor/controller 82 via a bus 89. The I/O circuitry 88, e.g., receives the digitized output signal from the buffer 42, processes that signal and generates a wakeup signal as appropriate to the remaining circuitry in the IoT device 20, e.g., the smart speaker 20*a* (FIG. 2).

In some implementations, the processing device 80 performs the function of the threshold detector 34*b* to detect when an acoustic input to the e.g., microphone equals or exceeds a threshold level, e.g., by detecting when the digitized output from the buffer equals or exceeds an amplitude level or is within a frequency band. Because detection is performed by the processing device 80, rather than being included in the acoustic device, e.g., hybrid integrated microphone/detector, the processing device 80 needs to remain powered on to detect the audio stimulus.

A number of embodiments of the technology have been described. Nevertheless, it will be understood that various modifications may be made without departing from the spirit and scope of the disclosure. Accordingly, other embodiments are within the scope of the following claims.

What is claimed is:

1. An apparatus comprising:

a switch including an input port, a first output port, a second output port, and a control port, wherein the input port is coupled to an output of an acoustic sensor element to receive an output signal from the acoustic sensor element;

a first channel coupled to the first output port of the switch and configured to convert the output signal from the acoustic sensor element into a first digitized output signal, the first channel configured to operate at a first power level;

a second channel coupled to the second output port of the switch and configured to convert the output signal from the acoustic sensor element into a second digitized output signal, the second channel configured to operate at a second power level that is higher than the first power level; and a digital voltage level detector including a first input coupled to an output of the first channel to receive the first digitized output signal, a second input coupled to an output of the second channel to receive the second digitized output signal, and an output coupled to the control port of the switch, wherein the digital voltage level detector is configured to produce a control signal at the control port of the switch to select the second output port of the switch based on a determination that the first digitized output signal from the first channel meets a threshold criteria indicative of a presence of specified acoustic activity.

2. The apparatus of claim 1, wherein the first channel comprises:

a first analog front end including an input and an output, wherein the input of the first analog front end is coupled to the first output port of the switch; and a first analog-to-digital converter including an input and an output, wherein the input of the first analog-to-digital converter is coupled to the output of the first analog front end and the output of the first analog-to-digital converter is coupled to the first input of the digital voltage level detector.

3. The apparatus of claim 2, wherein the second channel comprises:

a second analog front end including an input and an output, wherein the input of the second analog front end is coupled to the second output port of the switch; and a second analog-to-digital converter including an input and an output, wherein the input of the second analog-to-digital converter is coupled to the output of the second analog front end and the output of the second analog-to-digital converter is coupled to the second input of the digital voltage level detector.

4. The apparatus of claim 1, wherein the first channel comprises a first analog-to-digital converter and the second channel comprises a second analog-to-digital converter.

5. The apparatus of claim 4, further comprising:

a conversion circuit coupled between an output of the first analog-to-digital converter and an output of the second analog-to-digital converter, wherein the conversion circuit is configured to format the first digitized output signal or the second digitized output signal into an audio signal format based on the control signal.

6. The apparatus of claim 5, further comprising:

a buffer coupled to an output of the conversion circuit, wherein the buffer is configured to store the first digitized output signal or the second digitized output signal in the audio signal format.

7. The apparatus of claim 4, wherein the first analog-to-digital converter is a successive approximation register type of analog-to-digital converter, and wherein the second analog-to-digital converter is a Sigma-Delta type of analog-to-digital converter.

8. The apparatus of claim 1, wherein the digital voltage level detector is configured to produce the control signal with a second state that causes the switch to feed the output signal from the acoustic sensor element to the first channel when the second digitized output signal falls below the threshold criteria.

9. The apparatus of claim 1, wherein the acoustic sensor element is a MEMS piezoelectric-based microphone.

10. A method comprising:

receiving, at an input port of a switch, an output signal from an output of an acoustic sensor element, wherein the switch includes a first output port, a second output port, and a control port;

converting, by a first channel coupled to the first output port of the switch, the output signal from the acoustic sensor element into a first digitized output signal, the first channel configured to operate at a first power level;

converting, by a second channel coupled to the second output port of the switch, the output signal from the acoustic sensor element into a second digitized output signal, the second channel configured to operate at a second power level that is higher than the first power level; and producing, by a digital voltage level detector having a first input coupled to an output of the first channel and a second input coupled to an output of the second channel, a control signal at the control port of the switch to select the second output port of the switch based on a determination that the first digitized output signal from the first channel meets a threshold criteria indicative of a presence of specified acoustic activity.

11. The method of claim 10, wherein the digital voltage level detector comprises a first input coupled to the first channel, a second input coupled to the second channel, and an output coupled to the control port of the switch.

12. The method of claim 11, wherein the first channel comprises:

a first analog front end including an input and an output, wherein the input of the first analog front end is coupled to the first output port of the switch; and a first analog-to-digital converter including an input and an output, wherein the input of the first analog-to-digital converter is coupled to the output of the first analog front end and the output of the first analog-to-digital converter is coupled to the first input of the digital voltage level detector.

13. The method of claim 12, wherein the second channel comprises:

a second analog front end including an input and an output, wherein the input of the second analog front end is coupled to the second output port of the switch; and a second analog-to-digital converter including an input and an output, wherein the input of the second analog-to-digital converter is coupled to the output of the second analog front end and the output of the second analog-to-digital converter is coupled to the second input of the digital voltage level detector.

14. The method of claim 10, wherein the first channel comprises a first analog-to-digital converter and the second channel comprises a second analog-to-digital converter.

15. The method of claim 14, further comprising:
formatting, by a conversion circuit coupled between an output of the first analog-to-digital converter and an output of the second analog-to-digital converter, the first digitized output signal or the second digitized output signal into an audio signal format based on the control signal.

16. The method of claim 15, further comprising:
storing the first digitized output signal or the second digitized output signal in the audio signal format.

17. The method of claim 16, wherein the first digitized output signal or the second digitized output signal is stored in a buffer coupled to an output of the conversion circuit.

18. The method of claim 14, wherein the first analog-to-digital converter is a successive approximation register type of analog-to-digital converter, and wherein the second analog-to-digital converter is a Sigma-Delta type of analog-to-digital converter.

19. The method of claim 10, further comprising producing, by the digital voltage level detector, the control signal with a second state that causes the switch to feed the output signal from the acoustic sensor element to the first channel when the second digitized output signal falls below the threshold criteria.

20. The method of claim 10, wherein the acoustic sensor element is a MEMS piezoelectric-based microphone.

* * * * *